(12) United States Patent
Kempf et al.

(10) Patent No.: US 10,614,061 B2
(45) Date of Patent: Apr. 7, 2020

(54) PREDICTING USER INTENT BASED ON ENTITY-TYPE SEARCH INDEXES

(71) Applicant: salesforce.com, inc., San Francisco, CA (US)

(72) Inventors: Guillaume Kempf, Grenoble (FR); Marc Brette, Montbonnot-Saint-Martin (FR); Naren M. Chittar, Saratoga, CA (US); Anuprit Kale, Oakland, CA (US); Yasaman Mohsenin, San Francisco, CA (US); Pranshu Sharma, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 276 days.

(21) Appl. No.: 15/636,199

(22) Filed: Jun. 28, 2017

(65) Prior Publication Data
US 2019/0005089 A1    Jan. 3, 2019

(51) Int. Cl.
*G06F 16/00* (2019.01)
*G06F 16/242* (2019.01)
*G06F 16/248* (2019.01)

(52) U.S. Cl.
CPC ........ *G06F 16/2425* (2019.01); *G06F 16/248* (2019.01)

(58) Field of Classification Search
CPC .............. G06F 16/2425; G06F 16/248; G06F 16/90335; G06F 16/904; G06N 20/00; G06N 5/02; G06N 5/04
See application file for complete search history.

(56) References Cited

U.S. PATENT DOCUMENTS

| | | | |
|---|---|---|---|
| 8,266,162 B2 * | 9/2012 | Cava | G06F 16/951 707/755 |
| 9,542,450 B1 | 1/2017 | Jacobsson | |
| 2006/0184460 A1 | 8/2006 | Cleary | |
| 2007/0130137 A1 * | 6/2007 | Oliver | G06F 16/24578 |
| 2008/0195595 A1 * | 8/2008 | Masuyama | G06F 16/313 |
| 2008/0215565 A1 * | 9/2008 | Sun | G06F 16/9535 |
| 2011/0231347 A1 * | 9/2011 | Xu | G06F 16/951 706/12 |

(Continued)

OTHER PUBLICATIONS

United States Office Action, U.S. Appl. No. 15/481,366, dated Apr. 26, 2019, 20 pages.

*Primary Examiner* — Augustine K. Obisesan
(74) *Attorney, Agent, or Firm* — Fenwick & West LLP (57) ABSTRACT

An online system stores objects that may be accessed by users. The online system also stores indexes of terms related to different entity types of objects. When a user provides a search query, the online system compares the search terms with terms stored in the indexes. Based on the comparisons, the online system determines term features for entity types associated with an index. The online system provides the term features as inputs to a machine learning model. The machine learning model outputs a score for each entity type indicating a likelihood that the search query is for an object associated with the entity type. The machine learning model output is used by the online system to select one or more entity types that the user is likely searching for. The online system offers objects of the likely entity types to the user as results of the search query.

18 Claims, 5 Drawing Sheets

(56) References Cited

U.S. PATENT DOCUMENTS

| | | | |
|---|---|---|---|
| 2012/0078825 A1* | 3/2012 | Kulkarni | G06N 20/00 |
| | | | 706/12 |
| 2013/0024448 A1* | 1/2013 | Herbrich | G06F 16/951 |
| | | | 707/728 |
| 2013/0124505 A1* | 5/2013 | Bullotta | G06Q 10/0631 |
| | | | 707/722 |
| 2014/0089290 A1* | 3/2014 | Jackson | G06F 16/951 |
| | | | 707/711 |
| 2014/0222503 A1* | 8/2014 | Vijayaraghavan | ............... |
| | | | G06Q 30/0201 |
| | | | 705/7.29 |
| 2016/0171537 A1 | 6/2016 | Fanous et al. | |
| 2017/0004409 A1 | 1/2017 | Chu et al. | |
| 2018/0121533 A1 | 5/2018 | Magnani et al. | |
| 2018/0144051 A1 | 5/2018 | Stoyanov | |

* cited by examiner

PREDICTING USER INTENT BASED ON ENTITY-TYPE SEARCH INDEXES

BACKGROUND

Field of Art

The described embodiments pertain in general to databases, and in particular to predicting an entity type of an object searched for by a user.

Description of the Related Art

Online systems store objects accessible by users, such as documents, videos, and music files. When a user is interested in accessing data stored by an online system but the user doesn't know the specific object that includes the data or the storage location of the object, the user typically submits a search query to the online system. The online system returns to the user search results that include objects that are related to the search query.

To identify objects related to the search query, the online system can make an individual determination for each stored object as to whether it is related to the search query and whether it should be included in the search results. For an online system that stores a large amount of objects (e.g., a customer relationship management (CRM) system), this process of identifying objects related to a search query consumes a large amount of system resources (e.g., hardware resources). Additionally, processing such a query will take a long period of time and cause the user to have a negative experience with the online system. Further, if the most relevant objects to the search query are not included at the top of the search results, this will contribute to the user having a negative experience.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

DETAILED DESCRIPTION

Overview

The embodiments described herein provide methods, computer program products, and computer database systems for predicting an entity type of an object searched for by a user using machine learning techniques. An online system provides users with access to online services. For example, the online system may be a web-based customer relationship management (CRM) system that provides employees of an enterprise with access to CRM software applications. As part of providing the services to users, the online system stores multiple objects that are accessible by users of the online system. The objects may be generated, for example, by users or administrators of the online system.

Objects stored by the online system are associated with entity types. An entity type associated with an object describes a characteristic of the object, a category or a segment to which the object has been assigned. As an example, a CRM system may store objects associated with a user entity type because each object represents a user of the system, objects associated with an account entity type because each object represents a sales account, and objects associated with an opportunity entity type because each object represents a potential sale that has not yet been finalized. As another example, an online system may store objects that are media items, such as videos, audio files, and still images. Each object is associated with an entity type that indicates the type of media item of the object (e.g., a video, an audio file, or a still image). As an additional example, an online system may offer products for sale and store a different object (e.g., webpage) for each product. Each object is associated with an entity type that is a product category/department to which the respective product has been assigned.

In one embodiment, for each entity type that may be associated with stored objects, the online system stores a search index. A search index of an entity type includes terms associated with stored objects of the entity type. For example, the search index of an entity type may include the name of each stored object associated with the entity type. In one embodiment, a search index includes minimal information about an object (e.g., name or keywords) so that the index can be quickly searched.

The search indexes are used in processing search queries. To identify an object stored by an online system a user can provide a search query to the online system. When a user provides a search query, the online system extracts terms from the query and uses them to determine term features. Specifically, the online system determines a term feature for each potential entity type using the respective search index associated with the entity type. To determine a term feature for an entity type, the online system searches the respective search index using the terms from the search query. The value of the term feature for the entity type is based on the index search. For example, a term feature value for an entity type may be based on a number of times terms from the search query appear in the search index for the entity type.

In other embodiments, standard dictionaries could be used to determine the term features. For example, a name dictionary with names of users could be used to determine the term feature for the user entity type. However, by comparing terms from search queries to the search indexes rather than standard dictionaries, the online system saves space in memory that would otherwise be needed to store the dictionaries and avoids costs and agreements related to licensing the dictionaries. Further, since the search indexes include limited information for objects, it allows the term features to be determined quickly by reducing the scope of the searched material.

The online system provides the extracted term feature values to a machine learning model as an input. The machine learning model outputs a score for each entity type that indicates a likelihood that the search query is for an object associated with the entity type. In one embodiment, the machine learning model is a random forests model. The output from the machine learning model is used by the online system to select one or more entity types that the user is likely searching for. In one embodiment, the online system searches the stored objects based on the search query but limits the searching to objects associated with at least one of the selected entity types. For example, if there are fifty different entity types and the online system selects five entity types based on the machine learning model, the online system searches for objects associated with at least one of the five entity types.

The objects identified as being relevant to the search query are included in search results and provided to the user. In one embodiment, the output from the machine learning model is used to rank search results, where an object associated with an entity type that the user is more likely to be interested in is ranked higher than an object associated with an entity type that the user is less likely to be interested in. In some embodiments, the term features may be used to rank search results by entity type that the user is likely to be searching for.

The output from the machine learning model can also be used to suggest an entity type for the search query as the users enter the search query. For example, when a user enters part of a search query, the online system can receive the part of the search query, generate term features, and provide the features to the machine learning model. The entity types that the user is most likely searching for, as determined based on the model, may be suggested to the user for completing the search query as part of an autocomplete feature.

System Architecture

Figure 1:
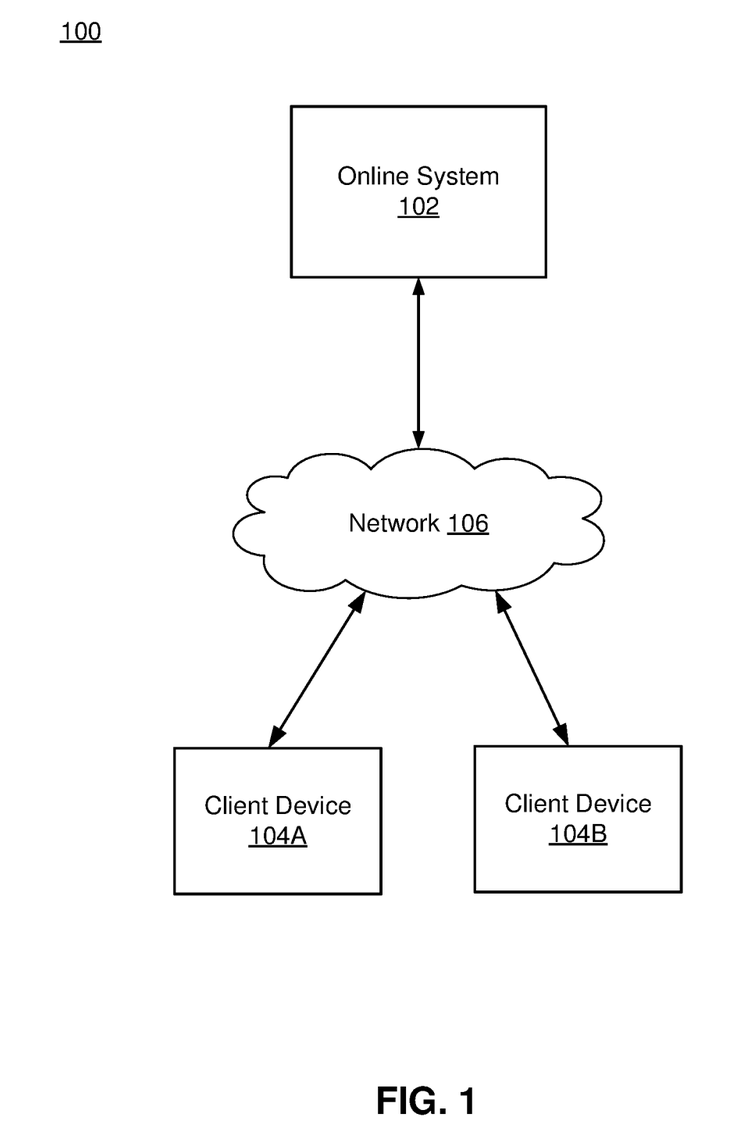
FIG. 1 is a block diagram of an online system environment according to one embodiment.

FIG. 1 is a block diagram of an online system environment 100 according to one embodiment. FIG. 1 illustrates an online system 102 and client devices 104A and 104B connected via a network 106. Although a select number of each entity are shown in FIG. 1, embodiments can have more or fewer of each entity (e.g., additional client devices 104).

The online system 102 is a computer system that provides services to users. In one embodiment, the online system 102 implements a web-based customer relationship management (CRM) system that provides users with CRM services. For example, in one embodiment, the online system 102 includes application servers configured to implement and execute CRM software applications. In other embodiments, the online system 102 provides other services or additional services that may include one or more of the following types of services: data storage, media hosting, online searching, social networking, shopping, advertising, news distribution, and so forth.

The online system 102 stores objects or at least an index of objects that are accessible by users through the online system 102. The online system 102 may also be referred to as a storage system. Objects may be provided by users or system administrators to the online system 102 for storage. Objects may include webpages, mobile application pages, media items (e.g., videos, audio files, still images), documents, forms, social posts, presentations, spreadsheets, text files, calendar entries, tasks, and other storable data.

In one embodiment, the online system 102 is a multi-tenant system that stores objects for multiple tenants. Each tenant may be an enterprise and the users that store and/or access stored objects are associated with one of the enterprises (e.g., employees, contractors, or other representatives of an enterprise). For example, one tenant might be a company that employs a sales force where each salesperson communicates with the online system 102 to manage their sales process. Thus, a user might store objects that comprise contact information, sale leads, sales opportunities, customer follow-up data, performance data, goals, progress data, calendar entries, tasks, documents, social information, contracts, etc. In one embodiment, the online system 102 implements security protocols that keep objects, data, applications, and application use separate for different tenants.

Objects accessible through the online system 102 are associated with one or more entity types. An entity type associated with an object describes a characteristic of the object or a segment (e.g., a category) to which the object has been assigned. The online system 102 stores a machine learning model that is trained to predict the entity type of an object that a user is searching for based on term features determined in response to a search query provided by the user. Term features are determined based on searching indexes related to entity types for search query terms.

In one embodiment, the online system 102 uses the output from the machine learning model to make searching for objects more efficient. When a user provides a search query, the online system 102 extracts terms from the query and provides term features determined based on the extracted terms to the machine learning model as an input. Based on the output from the machine learning model, the online system 102 limits the searching to objects associated with at least one of the entity types predicted by the model as an entity type that the user is searching for. In one embodiment, the online system 102 uses the output from the machine learning model to rank search results, where an object associated with an entity type that the user is more likely to be interested in is ranked higher than an object associated with an entity type that the user is less likely to be interested in.

In one embodiment, the online system 102 uses an output from the machine learning model as part of an autocomplete feature. As a user enters a search query, part of the search query that has already been entered by the user is received by the online system 102. The online system 102 determines term features based on terms extracted from the part of the query to the machine learning model. Based on the output from the machine learning model, the online system 102 suggests an entity type for the user to include with the search query. For example, if the online system 102 sells products and the user enters the word "shoe," the online system 102 may suggest based on the machine learning model that the user limit the searching to shoes in the women's category/department.

A client device 104 is a device used by a user to communicate with the online system 102. A client device 104 may be, for example, a desktop computer, laptop, smart phone, tablet computer, or personal digital assistant (PDA). A user communicates with the online system 102 through a client device 104 to use the services provided by the online system 102. As part of the services, the user may access objects stored by the online system 102. To identify an object to retrieve, a user may provide through the client device 104 a search query to the online system 102. The client device 104 receives from the online system 102 search results related to the query. Each search result identifies an object that the user can request to access. In one embodiment, a user may also use a client device 104 to provide an object to the online system 102 for storage.

The network 106 represents the communication pathways between the online system 102 and client devices 104. In one embodiment, the network 106 is the Internet and uses standard communications technologies and/or protocols. Thus, the network 106 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The data exchanged over the network 106 can be represented using technologies and/or formats including the hypertext markup language (HTML), the extensible markup language (XML), etc. In addition, all or some links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
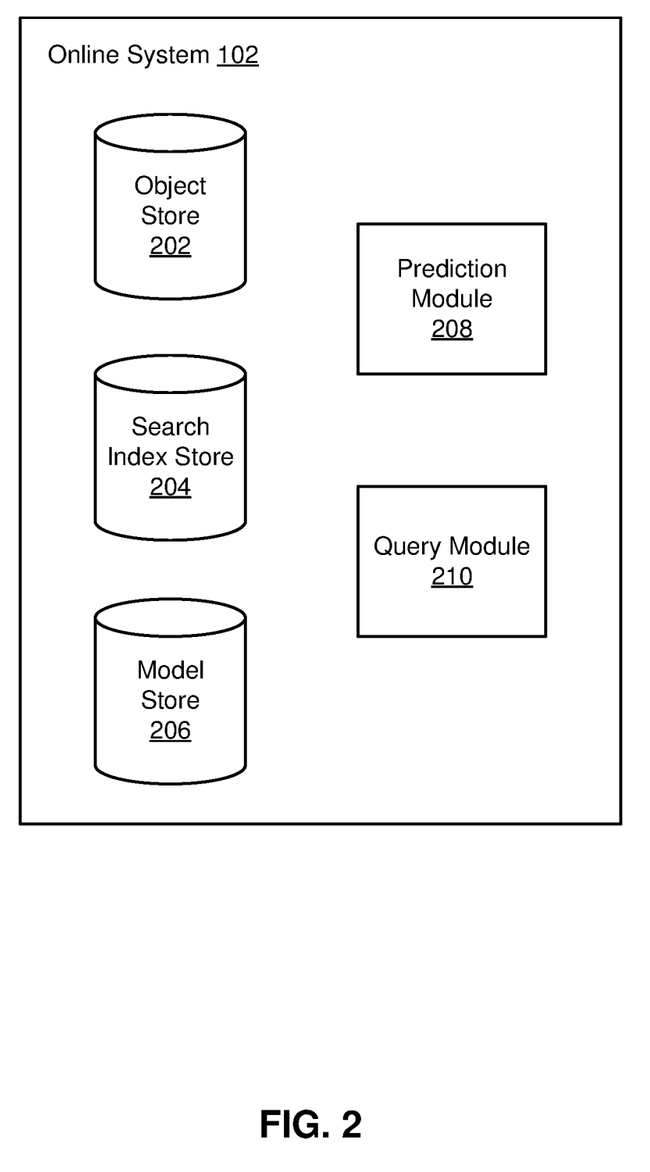
FIG. 2 is a block diagram illustrating components of an online system according to one embodiment.

FIG. 2 is a block diagram illustrating components of the online system 102 according to one embodiment. The online system 102 includes an object store 202, a search index store 204, a model store 206, a prediction module 208, and a query module 210. Those of skill in the art will recognize that other embodiments can have different and/or other components than the ones described here, and that the functionalities can be distributed among the components in a different manner.

The object store 202 stores objects accessible by users of the online system 102. Objects may include webpages, mobile application pages, media items (e.g., videos, audio files, still images), documents, forms, social posts, presentations, spreadsheets, text files, calendar entries, tasks, and other storable data. In one embodiment where the online system 102 is a multi-tenant system, the object store 202 stores objects of multiple tenants. However, the object store 202 implements security protocols that keep the objects of each tenant separate and ensures that a user is only able to access the objects of a tenant with whom the user is associated. For example, if a tenant is an enterprise, an employee of the enterprise can access objects associated with the enterprise but not objects of other tenants. In another embodiment, the online system 102 includes multiple object stores 202. Each object store 202 includes objects of one of the tenants.

Objects stored by the object store 202 are associated with one or more entity types. In one embodiment, each stored object is associated with at least one entity type. As described above, an entity type associated with an object describes a characteristic of the object or a segment to which the object has been assigned. In one embodiment, where the online system 102 is a CRM system, the entity types that can be associated with an object include an account, customer, person, sales opportunity, sales lead, case, feed item, task, performance item, calendar entry, social post, and progress item. In one embodiment, upon storing an object in the object store 202, one or more entity types are automatically associated with the object, for example, based on one or more of the following: a file type, how the object was created, the user that stored the object, data included in the object, keywords of the object, and sections of the object. In another embodiment, for one or more of the objects, a system administrator determines the one or more entity types to associate with the object.

The search index store 204 stores search indexes that include information about objects related to entity types. In one embodiment, the search index store 204 includes a search index for each entity type that can be associated with an object. A search index for an entity type stores information of objects from the object store 202 that are associated with the entity type. In one embodiment, a search index for an entity type stores titles and/or names of objects from the object store 202 that are associated with the entity type. For example, a search index for the "people" entity type may include the names of people objects stored in the object store 202. A search index may also store for an object keywords of the object. A search index stores limited information about objects of the corresponding entity (e.g., names or keywords related to objects), rather than storing the objects themselves. This reduces the amount of memory that is required to store search indexes and also reduces the time it takes to search a search index compared to the time it would take to perform a full search of the objects in the object store 202. In embodiments in which the online system 102 is a multi-tenant system, the search index store 204 may include for each tenant search indexes that are specific to entity types of the tenant.

The model store 206 stores at least one machine learning model trained to predict an entity type of an object searched for by a user. The machine learning model receives as an input a feature vector that includes term features determined based on terms extracted from a search query. In one embodiment, the feature vector may additionally include morphological features related to the search query (e.g., word length, number of words, whether the query contains digits, etc.). In one embodiment, for each potential entity type that can be associated with an object, the machine learning model outputs a likelihood score (e.g., a percentage) that indicates a likelihood that the search query is for an object associated with that entity type. In one embodiment, the machine learning model also outputs a likelihood score that indicates that the likelihood that the search query is not for any of the potential entity types.

For example, assume that the potential entity types are account, person, and sales opportunity. Based on a feature vector generated for a search query, the machine learning model may output the following likelihood scores: 0.7 account, 0.1 person, 0.1 sales opportunity, and 0.1 none. These likelihood scores indicated that there is a 70% likelihood that the query is for an account type object, 10% likelihood that the query is for a person type object, 10% likelihood that the query is for a sales opportunity type object, and 10% likelihood that the query is for none of the potential entity types.

In one embodiment, the machine learning model is a random forests model that includes multiple decision trees. Each decision tree represents a flow chart, comprising internal nodes, branches, and leaf nodes. Each internal node represents a test on a feature, each branch represents an outcome of a test, and each leaf node represents an entity type classification. For example, at an internal node a determination can be made as to whether the number of words in the query found in a particular search index is greater than a threshold. If the number of words is less than or equal to the threshold, the control flow transfers to a first branch which is connected to another internal node or a leaf node. If the number of words is greater than the threshold, the control flow transfers to a second branch connected to another internal node or leaf node.

The feature vector is provided to each decision tree of the model. Each decision tree outputs a classification of an entity type for the query based on the flow through the tree (i.e., each decision tree votes for an entity type). For each of the potential entity types, the model determines a likelihood score based on the number of decision trees that voted for the entity type from the total number of decision trees. In one embodiment, the likelihood score is the number of decision trees that voted for the entity type divided by the total number of decision trees of the random forests model. For example, if two out of ten decision trees voted for the person entity type, the likelihood score for the person entity type is 0.2. The random forests model outputs the likelihood scores determined for the entity types.

In one embodiment, where the online system 102 is a multi-tenant system, the model store 206 may store a different random forests model for each of the tenants. The random forests model of each tenant is trained based on training examples generated from previous search queries submitted by users associated with the tenant (e.g., employees of the tenant). It is beneficial to generate a random forests model for each tenant in that each tenant may have different entity types and users of each tenant may have different search behavior.

In other embodiments, the one or more models stored by the model store 206 may use a different machine learning algorithm than random forests for predicting an entity type of an object searched for by a user. For example, the one or more models stored by the model store 206 may use machine learning algorithms that include neural networks, deep learning, support vector machines, naïve Bayes, etc.

The prediction module 208 predicts an entity type of an object searched for by a user. When the query module 210 receives a search query provided by a user, the prediction module 208 generates a feature vector for the search query. The prediction module 208 includes in the feature vector term features that are determined based on terms extracted from the search query.

A term feature is based on a number of times terms from the search query are found in a corresponding search index from the search index store 204. In one embodiment, the prediction module 208 determines a term feature for each potential entity type. The term feature of an entity type is based on the number of times terms from the search query are found in the search index of the entity type. An example of generating term features using search indexes is described below with reference to FIG. 3.

In some embodiments, the prediction module 208 may additionally extract morphological features from the search query and include the morphological features in the feature vector that is provided to the model. The morphological features include the number of words in the search query, whether the query includes an email address, whether the query includes numbers, and whether the query is a mix of letters and numbers.

If only a single machine learning model is stored in the model store 206, the prediction module 208 provides the feature vector to the stored model as an input. If the model store 206 includes multiple machine learning models, the prediction module 208 selects the model appropriate for the search query and provides the feature vector to the selected model as an input. For example, if the online system 102 is a multi-tenant system and the model store 206 includes a model for each tenant, the prediction module 208 selects the machine learning model of the tenant with which the user providing the search query is associated.

The prediction module 208 obtains the output of the machine learning model to which the feature vector was provided. The output indicates one or more entity types that the user is likely searching for. In one embodiment, the output includes a likelihood score for each potential entity type that can be associated with an object. The likelihood score associated with an entity type indicates a likelihood that the search query is for an object associated with that entity type. The prediction module 208 provides the likelihood score for each entity type to the query module 210.

The query module 210 processes search queries provided by users. In one embodiment, when the query module 210 receives a search query provided by a user, the query module 210 provides the search query to the prediction module 208. In response to providing the search query, the query module 210 receives from the prediction module 208 entity types and a likelihood score for each entity type. The query module 210 searches the object store 202 for objects related to the search query based on the entity types received from the prediction module 208. In one embodiment, to perform the search, the query module 210 selects each entity type received from the prediction module 208 with a likelihood score above a threshold value. In another embodiment, the query module 210 selects a set number of entity types with the highest likelihood scores (e.g., entity types with the three highest scores). The query module 210 searches the object store 202 for objects related to the search query that are associated with at least one of the selected entity types. Hence, the search may be automatically narrowed to entity types that the user is likely searching for as indicated by the likelihood scores.

The query module 210 generates search results that include the objects found based on the search and transmits the search results to the client device 104 of the user for display. In one embodiment, the query module 210 ranks each object in the search results based on its relation to the search query and the likelihood scores of the entity types associated with the object. In one embodiment, objects are ranked based on a function where the higher the likelihood score of an entity type associated with an object, the higher the rank of the object in the search results.

In another embodiment, the query module 210 does not limit the search to objects associated with selected entity types. The query module 210 searches for objects related to the search query. However, the query module 210 ranks each object in the search results based on its relatedness to the search query and the likelihood scores of the entity types associated with the object.

In one embodiment, a query received from the query module 210 is part of a query being entered by a user. For example, as a user enters a first word of a query, the client device 104 of the user may provide the first word to the online system 102 using Ajax. The query module 210 provides the part of the query to the prediction module 208. The prediction module 208 selects a number of entity types based on likelihood scores received from the prediction module 208 for the part of the query. The query module 210 instructs the client device 104 of the user to update the user interface being used by the user for entering the search query to include the selected entity types. The selected entity types are included in the user interface as part of an autocomplete feature that suggests terms for the search query.

For example, if the user enters the word "dog," prior to the user entering the next word for the search query, the user may receive a suggestion to search for dog objects associated with entity type X or associated with entity type Y, where the entity type X and entity type Y received the highest likelihood scores. If the user enters another term (e.g., dog ran), the query module 212 repeats the process and suggests a new set of entity types for the search query. If the user selects a suggested entity type, the query module 212 searches the object store 202 for objects related to the search query and associated with the selected entity type.

Examples/Processes

Figure 3:
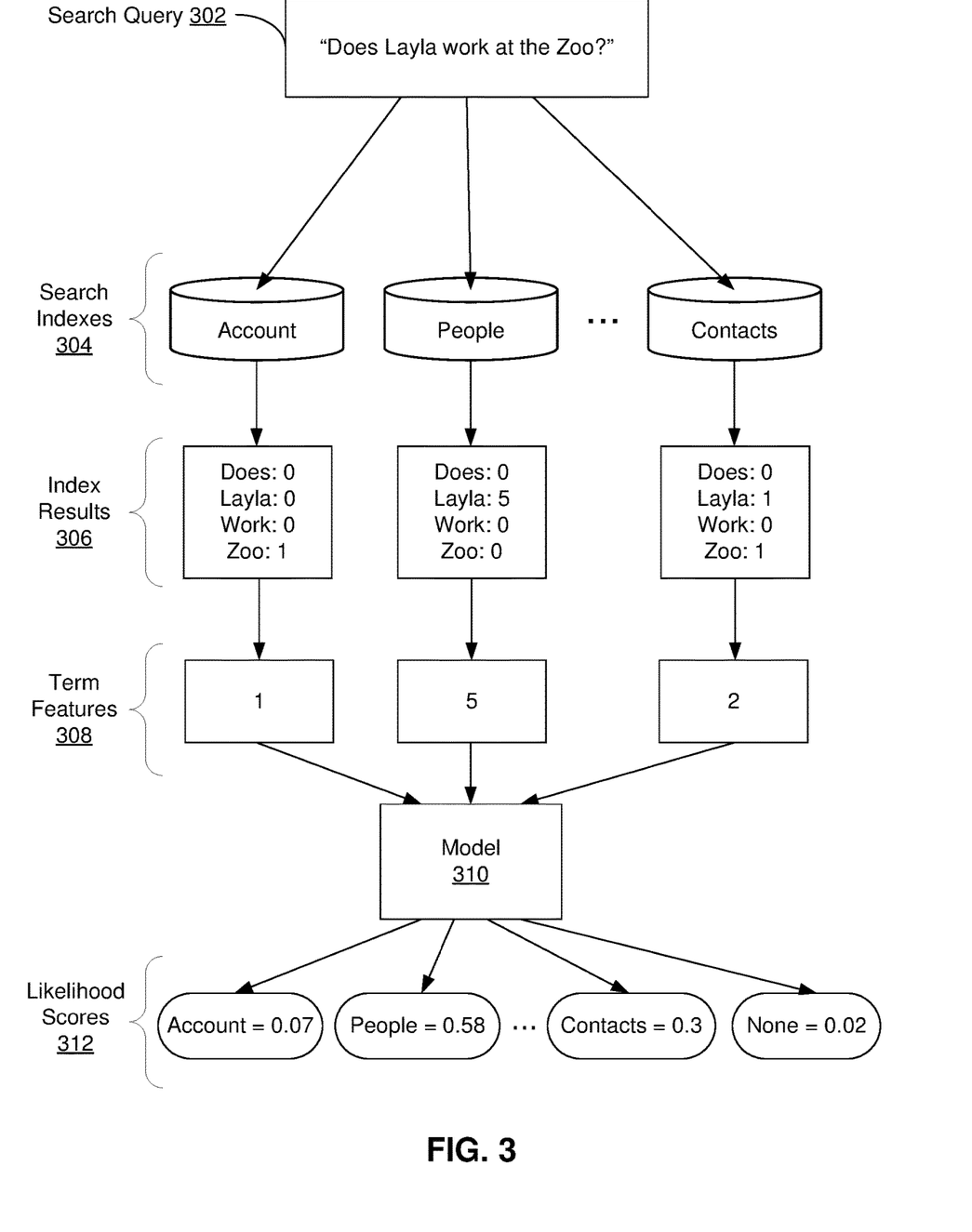
FIG. 3 is a data flow diagram illustrating example operations of the online system in generating term features based on a search query according to one embodiment.

FIG. 3 is a data flow diagram illustrating example operations of the online system 102 in generating term features based on a search query, according to one embodiment. The query module 210 receives a search query 302, for example, when a user inputs search terms into a client device 104. In the example, of FIG. 3, a user has entered a search query 302 that says "Does Layla work at the Zoo?" The query module 210 passes the search query to the prediction module 208, so that the prediction module 208 can predict an entity type for an object that the user is searching for when the user entered the search query 302.

The prediction module 208 searches the search indexes stored in the search index store 204 for terms of the search query. For example, FIG. 3 shows the search query 302 being compared to search indexes 304 for "Account" objects, "People" objects, and "Contacts" objects. In some embodiments, the online system 102 keeps records of the most commonly searched entity types and searches the search indexes 304 that are associated with the commonly searched entity types. Each such index search/comparison produces an index result 306. According to one embodiment, an index result 306 is a count of a number of times each term in the search query 302 is present in a corresponding search index 304. In the example of FIG. 3, the search index 304 for the "Account" entity type includes the term "zoo" once, and does not include the terms "does", "Layla", and "work". The "People" search index 304 for the "People" entity type includes the term "Layla" five times, but does not include the terms "does", "work", and "zoo". The search index 304 for the "Contacts" entity type includes the term "Layla" once, the term "zoo" once, and the terms "does" and "work" do not appear.

The prediction module 208 uses the index results 306 to generate term features 308. In one embodiment (shown in FIG. 3), the prediction module 208 determines a term feature 308 for each entity type by summing the total number of times query terms are present in respective search indexes 304. For example, in FIG. 3, the term feature 308 for the "Account" entity type is one, the term feature 308 for the "People" entity type is five, and the term feature for the "Contact" entity type two. In other embodiments, the index results 306 may be combined in different ways to generate values of the term features 308. For example, instead of determining a sum of the number of times terms from the search query 302 appear in the search index 304, the prediction module 208 may determine a maximum number of times a single term from the search query 302 is present in the search index. In some embodiments, the prediction module 208 normalizes the values of term features 308 by dividing a value related to term frequency (e.g., the sum of the number of times terms of the search query 302 are found in a search index 304 divided by a total number of terms, documents, and/or entries stored in the corresponding search index 304 or a total number of objects associated with the corresponding entity type).

The term features 308 are provided as inputs to a machine learned model 310 from the model store 206. In some embodiments, additional features of the search query 302, such as morphological features are also provided as inputs to the model. In one embodiment, the model 310 determines likelihood scores 312 associated with possible entity types. That is, a likelihood score 312 may represent a prediction by the prediction module 208 that the user who entered the search query 302 is searching for an object of the corresponding entity type. For example, in FIG. 3, the model 310 predicts a 0.07 likelihood that the search query 302 is for an account entity type object, 0.58 likelihood that that the search query 302 is for a person entity type object, 0.3 likelihood that the search query 302 is for a contacts entity type object, and 0.02 likelihood that the search query 302 is for none of the entity types.

Figure 4:
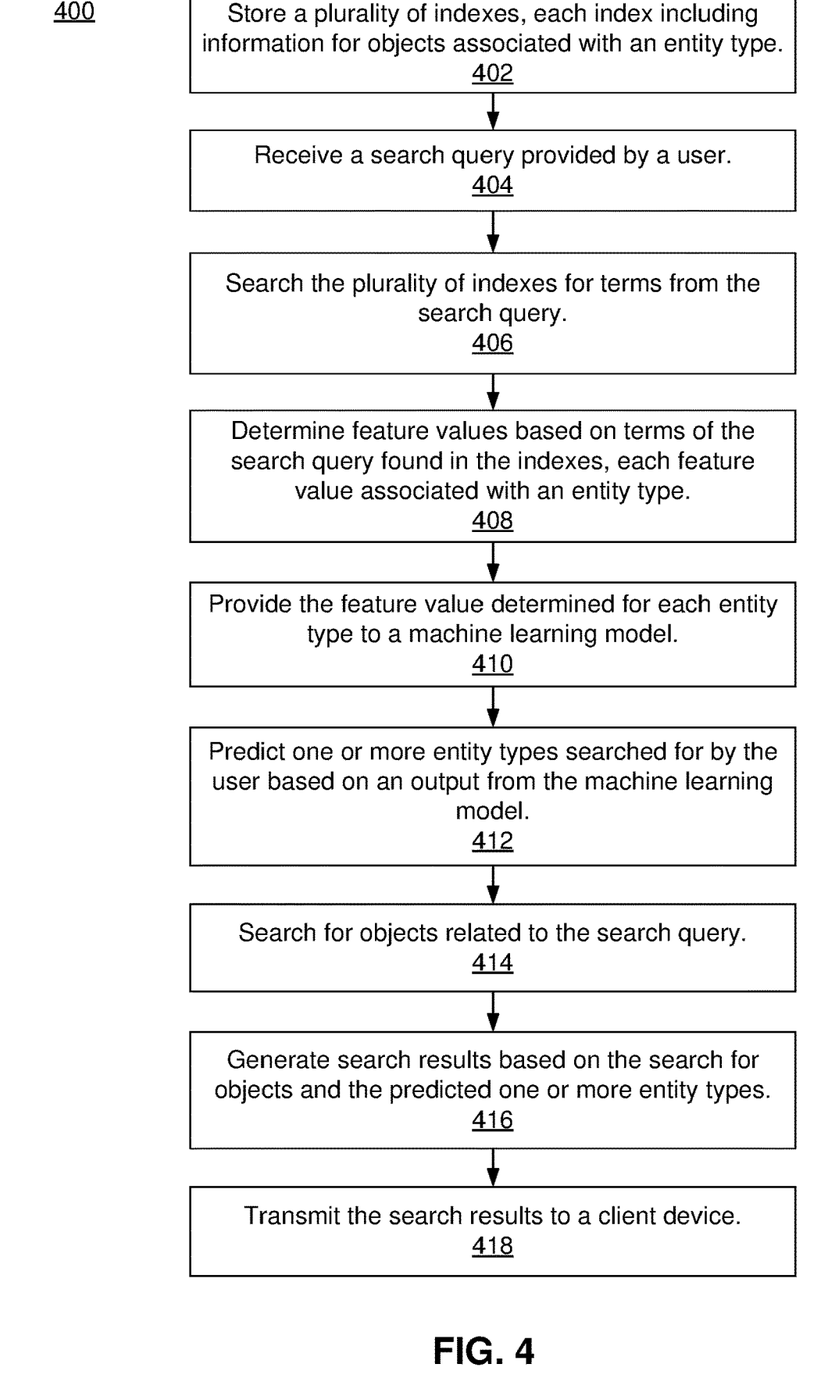
FIG. 4 is a flow chart illustrating operations of the online system in processing a search query using search term indexes according to one embodiment.

FIG. 4 is a flow chart 400 illustrating operations of the online system 102 in processing a search query according to one embodiment. Those of skill in the art will recognize that other embodiments can perform the steps of FIG. 4 in different orders. Moreover, other embodiments can include different and/or additional steps than those described herein.

The online system 102 stores 402 a plurality of indexes, each index including information (e.g., name of keywords) for objects associated with an entity type. The online system 102 receives 404 a search query provided by a user. The online system 102 searches 406 the plurality of indexes for terms from the search query and determines 408 feature values based on the searching. Each feature determined by the online system is associated with an entity type. The feature of an entity type may be based on the number of times terms of the search query appear in the search index corresponding to the entity type.

The online system 102 provides 410 the feature value determined for each entity type to a machine learning model and predicts 412 at least one entity type that the user is searching for based on the machine learning model and the extracted feature values. In one embodiment, the online system 102 includes the extracted features in a feature vector and provides the feature vector to the machine learning model as input. The online system 102 receives the output of the machine learning model which includes a likelihood score for each potential entity type. In one embodiment, the online system 102 selects at least one entity type based on the likelihood score of the entity type. The selected entity type is the entity type of the object that the user who entered the search query is likely searching for.

The online system 102 searches 414 the object store 202 for objects related to the search query and associated with the one or more predicted entity types. The online system 102 generates 416 search results based on the search for objects related to the search query and the predicted entity types. The search results are transmitted 418 by the online system to a client device 104 of the user.

Figure 5:
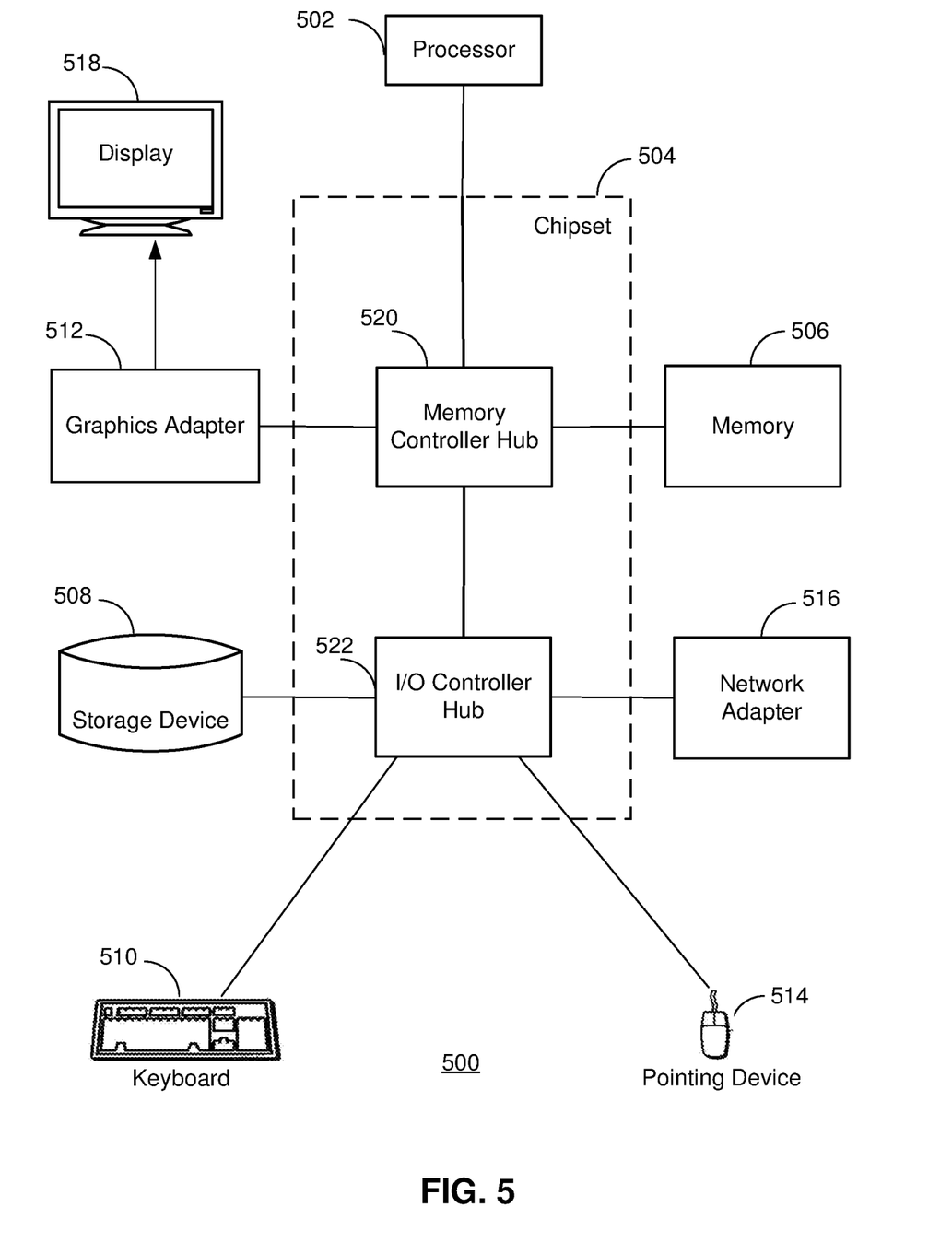
FIG. 5 is a block diagram illustrating a functional view of a typical computer system for use as one of the entities illustrated in the environment of FIG. 1 according to one embodiment.

FIG. 5 is a high-level block diagram illustrating a functional view of a typical computer system for use as one of the entities illustrated in the environment 100 of FIG. 1 according to an embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is a non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer system 200. The graphics adapter 512 displays images and other information on the display 518. The network adapter 516 couples the computer system 500 to the network 106.

As is known in the art, a computer 500 can have different and/or other components than those shown in FIG. 5. In addition, the computer 500 can lack certain illustrated components. For example, a computer system 500 acting as an online system 102 may lack a keyboard 510 and a pointing device 514. Moreover, the storage device 508 can be local and/or remote from the computer 500 (such as embodied within a storage area network (SAN)).

The computer 500 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 508, loaded into the memory 506, and executed by the processor 502.

The types of computer systems 500 used by the entities of FIG. 1 can vary depending upon the embodiment and the processing power used by the entity. For example, a client device 104 may be a mobile phone with limited processing power, a small display 518, and may lack a pointing device 514. The online system 102, in contrast, may comprise multiple blade servers working together to provide the functionality described herein.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer implemented method for processing search queries, the method comprising:
 storing, by an online system, a plurality of indexes, each of the plurality of indexes including terms for objects associated with an entity type from a plurality of entity types, wherein an entity type corresponds to a category of objects;
 receiving, by an online system, a search query provided by a user;
 searching, by the online system, the plurality of indexes for terms of the search query;
 determining, by the online system for each of the plurality of entity types, a feature value based on terms of the search query found in the index from the plurality of indexes associated with the entity type according to the searching, wherein determining the feature value comprises determining a value related to a total number of times at least one term from the search query is present in the index and dividing the value by the number of terms stored in the index;

providing, by the online system to a machine learning model as an input, the feature value determined for each entity type;

predicting, by the online system, one or more entity types searched for by the user from the plurality of entity types based on an output generated by the machine learning model according to the input;

searching, by the online system, for objects related to the search query;

generating, by the online system, search results based on the searching for objects and the predicted one or more entity types; and transmitting, by the online system to a client device, the search results.

2. The computer-implemented method of claim 1, wherein the online system is a multi-tenant system and wherein searching the plurality of indexes for terms of the search query comprises searching indexes that are specific to a tenant with which the user is associated.

3. The computer-implemented method of claim 1, wherein an index from the plurality of indexes associated with an entity type includes a name or title for each stored object associated with the entity type.

4. The computer-implemented method of claim 1, wherein an index from the plurality of indexes associated with an entity type includes keywords of each stored object associated with the entity type.

5. The computer-implemented method of claim 1, wherein determining a feature value based on terms of the search query found in the index comprises:
    determining which term appears most in the index from the terms of the query.

6. The computer-implemented method of claim 1, wherein generating search results based on the searching for objects and the predicted one or more entity types comprises:
    ordering objects included in the search results based on the likelihood scores output by the machine learning model for the entity type associated with each of the objects.

7. A non-transitory computer-readable storage medium storing computer executable code that when executed by one or more processors causes the one or more processors to perform operations comprising:
    storing, by an online system, a plurality of indexes, each of the plurality of indexes including terms for objects associated with an entity type from a plurality of entity types, wherein an entity type corresponds to a category of objects;
    receiving, by an online system, a search query provided by a user;
    searching, by the online system, the plurality of indexes for terms of the search query;
    determining, by the online system for each of the plurality of entity types, a feature value based on terms of the search query found in the index from the plurality of indexes associated with the entity type according to the searching, wherein determining the feature value comprises determining a value related to a total number of times at least one term from the search query is present in the index and dividing the value by the number of terms stored in the index;
    providing, by the online system to a machine learning model as an input, the feature value determined for each entity type;
    predicting, by the online system, one or more entity types searched for by the user from the plurality of entity types based on an output generated by the machine learning model according to the input;
    searching, by the online system, for objects related to the search query;
    generating, by the online system, search results based on the searching for objects and the predicted one or more entity types; and
    transmitting, by the online system to a client device, the search results.

8. The non-transitory computer-readable storage medium of claim 7, wherein the online system is a multi-tenant system and wherein searching the plurality of indexes for terms of the search query comprises searching indexes that are specific to a tenant with which the user is associated.

9. The non-transitory computer-readable storage medium of claim 7, wherein an index from the plurality of indexes associated with an entity type includes a name or title for each stored object associated with the entity type.

10. The non-transitory computer-readable storage medium of claim 7, wherein an index from the plurality of indexes associated with an entity type includes keywords of each stored object associated with the entity type.

11. The non-transitory computer-readable storage medium of claim 7, wherein determining a feature value based on terms of the search query found in the index comprises:
    determining which term appears most in the index from the terms of the query.

12. The non-transitory computer-readable storage medium of claim 7, wherein generating search results based on the searching for objects and the predicted one or more entity types comprises:
    ordering objects included in the search results based on the likelihood scores output by the machine learning model for the entity type associated with each of the objects.

13. A system comprising:
    one or more computer processors; and
    a non-transitory computer-readable storage medium comprising computer executable code that when executed by the one or more processors causes the one or more processors to perform operations comprising:
        storing, by an online system, a plurality of indexes, each of the plurality of indexes including terms for objects associated with an entity type from a plurality of entity types, wherein an entity type corresponds to a category of objects;
        receiving, by an online system, a search query provided by a user;
        searching, by the online system, the plurality of indexes for terms of the search query;
        determining, by the online system for each of the plurality of entity types, a feature value based on terms of the search query found in the index from the plurality of indexes associated with the entity type according to the searching, wherein determining the feature value comprises determining a value related to a total number of times at least one term from the search query is present in the index and dividing the
value by the number of terms stored in the index;
providing, by the online system to a machine learning
model as an input, the feature value determined for
each entity type;
predicting, by the online system, one or more entity
types searched for by the user from the plurality of
entity types based on an output generated by the
machine learning model according to the input;
searching, by the online system, for objects related to
the search query;
generating, by the online system, search results based
on the searching for objects and the predicted one or
more entity types; and
transmitting, by the online system to a client device, the
search results.

14. The system of claim 13, wherein the online system is a multi-tenant system and wherein searching the plurality of indexes for terms of the search query comprises searching indexes that are specific to a tenant with which the user is associated.

15. The system of claim 13, wherein an index from the plurality of indexes associated with an entity type includes a name or title for each stored object associated with the entity type.

16. The system of claim 13, wherein an index from the plurality of indexes associated with an entity type includes keywords of each stored object associated with the entity type.

17. The system of claim 13, wherein determining a feature value based on terms of the search query found in the index comprises:
    determining which term appears most in the index from the terms of the query.

18. The system of claim 13, wherein generating search results based on the searching for objects and the predicted one or more entity types comprises:
    ordering objects included in the search results based on the likelihood scores output by the machine learning model for the entity type associated with each of the objects.

* * * * *